United States Patent
Del Giudice et al.

(10) Patent No.: US 11,977,490 B2
(45) Date of Patent: May 7, 2024

(54) METHOD FOR EXECUTING A TRANSACTION

(71) Applicant: Idemia Identity & Security France, Courbevoie (FR)

(72) Inventors: Lauren Marjorie Del Giudice, Courbevoie (FR); Rémi Louis Marie Duclos, Courbevoie (FR); Aurélien Cuzzolin, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/755,654

(22) PCT Filed: Oct. 27, 2020

(86) PCT No.: PCT/FR2020/051936
§ 371 (c)(1),
(2) Date: May 4, 2022

(87) PCT Pub. No.: WO2021/089928
PCT Pub. Date: May 14, 2021

(65) Prior Publication Data
US 2022/0300427 A1     Sep. 22, 2022

(30) Foreign Application Priority Data

Nov. 4, 2019   (FR) ....................... 1912338

(51) Int. Cl.
*G06F 12/0868*   (2016.01)
*G06F 12/0804*   (2016.01)
*G06F 12/0817*   (2016.01)

(52) U.S. Cl.
CPC ...... *G06F 12/0868* (2013.01); *G06F 12/0804* (2013.01); *G06F 12/0822* (2013.01); *G06F 2212/1016* (2013.01)

(58) Field of Classification Search
CPC ............ G06F 12/0868; G06F 12/0804; G06F 12/0822; G06F 2212/1016
See application file for complete search history.

(56) References Cited

U.S. PATENT DOCUMENTS

| | | | |
|---|---|---|---|
| 2004/0123040 A1 | 6/2004 | Jung et al. | |
| 2016/0179687 A1* | 6/2016 | Kumar | G06F 12/0895 711/135 |

(Continued)

FOREIGN PATENT DOCUMENTS

| | | |
|---|---|---|
| EP | 1286269 A2 | 2/2003 |
| FR | 2988878 A1 | 10/2013 |

(Continued)

*Primary Examiner* — Prasith Thammavong
(74) *Attorney, Agent, or Firm* — NIXON & VANDERHYE (57) ABSTRACT

A method for executing a transaction for a processor associated with a persistent memory and with a cache memory, the cache memory comprising cache lines associated with respective states, including:
  if a cache line is associated with a state allowing data to be copied directly:
  copying data to the cache line;
  associating the line with a state representative of an allocation to transaction data;
  otherwise:
  flushing lines associated with a state representative of an allocation to external data and associating them with a state indicating that content of the lines has not been modified;
  copying data to the flushed lines;
  associating these lines with a state representative of an allocation to transaction data.

8 Claims, 3 Drawing Sheets

(56) References Cited

U.S. PATENT DOCUMENTS

2017/0177365 A1\* 6/2017 Doshi .................. G06F 9/467
2019/0042333 A1 2/2019 Willhalm et al.
2019/0129716 A1\* 5/2019 Calciu ................ G06F 11/1471

FOREIGN PATENT DOCUMENTS

WO 2016023236 A1 2/2016
WO 2019207285 A2 10/2019

\* cited by examiner

METHOD FOR EXECUTING A TRANSACTION

The invention relates to the field of computer memory, in particular of cache memory. The invention notably relates to a method for writing data into the cache memory of a processor (or central processing unit, CPU) of a computer.

The cache memory (or simply "cache") is used to temporarily save copies of data originating from a persistent memory (or external memory), i.e. a non-volatile memory, for example a flash memory. This makes it possible to significantly reduce the access time for subsequent reading of this data by the processor. The data is transferred between the persistent memory and the cache in fixed size blocks called "cache lines" or "cache blocks".

When the processor wants to read data from an area of the persistent memory, or to write data into an area of the persistent memory, it is checked whether the cache contains this data. In such a case, this data is retransmitted to the processor—this is referred to as a "cache hit". However, if the cache does not contain the data, the latter is requested from the persistent memory—this is referred to as a "cache miss". The data is then copied from the persistent memory to available cache lines, then transmitted from the cache to the processor.

When the cache is completely full, it is necessary to flush cache lines to the persistent memory before allocating new cache lines to write data. Flushing a cache line, when this cache line has been modified, means that the content of this line is copied to the persistent memory (i.e. synchronized with the persistent memory), then deleted. It is therefore possible to write new data into the cache lines thus flushed.

It is generally necessary to write data into the persistent memory, and therefore to copy corresponding lines from the cache, when executing a transaction. As a reminder, a transaction corresponds to a series of operations, or instructions, which have certain properties. In particular, a transaction is atomic, in other words the series of operations is indivisible: the transaction is either committed, or aborted. When the transaction is aborted, all of the processed data returns to its initial state (rollback). In the field of telecommunications, the loading of a customer profile in an Embedded SIM card generally comprises a plurality of transactions, which may be located at the system level, or at the application level. Other applications may be considered, such as making a payment from a secure element.

Each instruction may require data to be copied into cache lines; some of these lines may have already been modified during previous operations. Consideration is only given here to transactions which require the modification of a number of lines less than or equal to N, N being the maximum number of cache lines physically available in the cache. Moreover, it is considered here that the transactions can be initialized, committed, aborted or suspended by programming.

In conventional approaches, all the cache lines are flushed upon the initialization of a transaction, before executing the first instruction. Thus, if the transaction requires the modification of at most N lines, there is no risk that the cache is full and, unless there has been an error, the transaction may be completed normally.

Flushing the cache lines in their entirety and systematically is very costly in terms of time and power consumption, and causes premature excessive wear of the persistent memory.

There is consequently a need for a method for executing a transaction by a processor which is not affected by the abovementioned problems.

OVERVIEW OF THE INVENTION

A method implemented by a processor is thus proposed to execute a transaction, said transaction comprising a sequence of instructions, the processor being associated with a persistent memory and with a cache memory, wherein the cache memory comprises a plurality of cache lines and each cache line is associated with a respective state from a set of predefined states, the method comprising, for at least one instruction of the sequence of instructions making it necessary to copy data to at least one cache line associated with a state other than a state representative of an allocation to data of said transaction:

a. if at least one cache line is associated with a state allowing data to be copied directly into said at least one cache line:
   i. copying data corresponding to said instruction into said at least one cache line; and
   ii. associating said at least one cache line to a state representative of an allocation to data of said transaction;
b. if no cache line is associated with a state allowing data to be copied directly:
   i. for each cache line from a set of cache lines associated with a state representative of an allocation to data external to said transaction, copying a respective content of said cache line to the persistent memory, and deleting said content from said cache line;
   ii. associating the cache lines from which the respective contents have been deleted with a state indicating that a content of said lines has not been modified;
   iii. copying data corresponding to said instruction into at least one cache line among the cache lines from which the respective contents have been deleted; and
   iv. associating said at least one cache line with a state representative of an allocation to data of said transaction.

An "instruction" is understood to mean a set of instructions which must be performed in an atomic manner, i.e. committed or aborted. The instructions considered in the context of the present invention are instructions requiring data to be written into one or several cache lines—of course, the transaction considered may also comprise instructions which do not require such writing of data. In particular, the above method applies to instructions requiring data to be written into one or several cache lines in which data corresponding to the transaction considered has not yet been written. Of course, the transaction may also comprise instructions which make it necessary to modify the content of lines in which transaction data has already been written: for these instructions, the content of these lines is simply modified with new data.

According to the present invention, the cache lines are associated with states, which indicate whether it is possible or not to write data into these cache lines. Rather than flushing the cache when a transaction is initialized, it is proposed to flush only certain cache lines, solely when necessary, that is when there is no longer any cache line into which data can be written (or "copied"). For some transactions, no flush is thus necessary. The energy consumed is reduced, and the components (notably the persistent memory) are less subject to wear. In the context of an operation involving a large number of transactions, the execution time of this operation is found to be significantly reduced.

The possible states for a cache line may notably include:
- a state representative of an allocation to data of said transaction: this state indicates that the content of the cache line has been modified in the context of the transaction concerned;
- a state representative of an allocation to data external to said transaction: this state indicates that the content of the cache line has been modified, but with data which does not match an instruction of the transaction concerned; and
- a state indicating that a content of said lines has not been modified: this state indicates that the data has been synchronized with the persistent memory (simple reading).

When there are not enough cache lines available to write data corresponding to an instruction, a flush is performed on a set of lines from the lines, the content of which has been modified with data external to the transaction.

In one or several embodiments, only part of these lines are flushed. In other words, said set comprises a number of lines strictly below the total number of lines, the content of which has been modified with external data.

Alternatively, said set comprises all the cache lines associated with a state representative of an allocation to data external to said transaction. In other words, all the lines of which the content has been modified with external data are flushed.

In one or several embodiments, respective contents of the cache lines associated with the state representative of an allocation to data of said transaction cannot be deleted during the execution of said transaction.

The cache lines of which the content has been modified with transaction data are thus locked until the end of the transaction (committed or aborted), or until a power cut where applicable. Their content may be modified, but cannot be deleted during the execution of the transaction.

In one or several embodiments, the method further comprises:
- receiving an initialization command for the transaction;
- in response to receipt of the initialization command, preserving a current content of the cache memory; and
- executing a first instruction of the sequence of instructions according to the previous steps, the execution of the first instruction comprising a modification of the current content of the cache memory from data corresponding to the first instruction.

The initialization command of the transaction may be typically an instruction read in the persistent memory of the processor.

"Content of the cache memory" is understood to mean all of the contents of the cache lines of the cache memory. "Current content of the cache memory" is understood to mean the content of the cache memory upon initialization of the transaction. Upon receipt of the initialization or commitment command, the cache is not flushed, as opposed to conventional methods of the prior art. Thus, during the first instruction requiring data to be written, this current content is modified (as opposed to conventional methods where the first instruction comprises writing into lines, the content of which was deleted upon initialization).

In one or several embodiments, the method may further comprise:
- receiving a piece of information indicating whether the initialization command received corresponds to a transaction with no abort possible or to a transaction with abort possible.

The states which facilitate direct writing of data may differ depending on whether the transaction may be aborted or not. Determination of the type of transaction to be carried out (with or without abort possible) advantageously makes it possible to determine which states facilitate direct writing of data.

When the initialization command received corresponds to a transaction with no abort possible, according to one embodiment, the states making it possible to copy data directly may be:
- the state indicating that a content of the cache line has not been modified;
- the state representative of an allocation to data external to said transaction; and
- a state indicating that no data has been copied into the cache line.

In this case, transaction data may be directly copied into cache lines, the content of which has been modified with data external to the transaction. In one or several embodiments, these states are the only states allowing data to be copied directly.

In one or several embodiments, when the initialization command received corresponds to a transaction without abort possible, the method may further involve:
- receiving a validation instruction for said transaction;
- in response to receiving the validation instruction of said transaction, modifying the states of the cache lines associated with the state representative of an allocation to data of said transaction, and associating them with the state representative of an allocation to data external to said transaction.

The data which has been modified in the context of the transaction is, upon validation of this transaction, associated with a state indicating that it has been modified with external data. During the execution of a subsequent transaction, these lines may be flushed if there are not enough lines available to write data directly therein.

Alternatively, the initialization command received may correspond to a transaction with abort possible. In this case, according to one embodiment, the states allowing data to be copied directly may be:
- the state indicating that a content of the cache line has not been modified; and
- a state indicating that no data has been copied into the cache line.

In one or several embodiments, these states are the only states allowing data to be copied directly.

A state indicating that no data has been copied into the cache line corresponds to a "blank" line.

According to this alternative, it is not possible to copy data directly into a cache line associated with a state representative of an allocation to data external to said transaction. Thus, if there are not enough cache lines available to write data therein, it is these cache lines which are flushed, partially or completely, in order to then be able to write data into the flushed lines.

In one or several embodiments, when the initialization command received corresponds to a transaction with abort possible, the method may further involve:
- receiving a validation instruction for said transaction;
- in response to receiving the validation instruction of said transaction, modifying the states of the cache lines associated with the state representative of an allocation to data of said transaction, and associating them with the state representative of an allocation to data external to said transaction.

Alternatively, the method may comprise:

receiving an abort instruction for said transaction;

in response to receipt of the abort instruction for said transaction, deleting respective content from cache lines associated with the representative state of an allocation to data of said transaction, and associating the cache lines from which the respective contents have been deleted with the state indicating that no data has been copied into the cache line.

The method may further thus comprise:

in response to receiving the abort instruction of said transaction, preserving the respective contents of the cache lines associated with the state representative of an allocation to data external to said transaction.

According to this embodiment, the cache lines having been modified by data external to the transaction are not flushed at the end of the transaction.

According to another aspect, a computer program product is proposed comprising instructions to implement each of the steps of the previous process, when this program is run by a processor.

According to another aspect of the invention, a non-transitory computer-readable recording medium is proposed, on which such a program is recorded.

According to another aspect, a device to execute a transaction is proposed, said transaction comprising a sequence of instructions, the device being associated with a persistent memory and a cache memory, wherein the cache memory comprises a plurality of cache lines and each cache line is associated with a respective state from a set of predefined states, the device comprising a circuit configured to:

for at least one instruction of the sequence of instructions making it necessary to copy data to at least one cache line associated with a state other than a state representative of an allocation to data of said transaction:

a. if at least one cache line is associated with a state allowing data to be copied directly into said at least one cache line:

i. copying data corresponding to said instruction into said at least one cache line; and ii. associating said at least one cache line to a state representative of an allocation to data of said transaction;

b. if no cache line is associated with a state allowing data to be copied directly:

i. for each cache line from a set of cache lines associated with a state representative of an allocation to data external to said transaction, copying a respective content of said cache line to the persistent memory, and deleting said content from said cache line;

ii. associating the cache lines from which the respective contents have been deleted with a state indicating that a content of said lines has not been modified;

iii. copying data corresponding to said instruction into at least one cache line from the cache lines from which the respective contents have been deleted; and iv. associating said at least one cache line with a state representative of an allocation to data of said transaction.

BRIEF DESCRIPTION OF THE DRAWINGS

Other characteristics, details and advantages of the invention may appear upon reading the following detailed description and upon analyzing the attached drawings, wherein.

DESCRIPTION OF THE EMBODIMENTS

Figure 1:
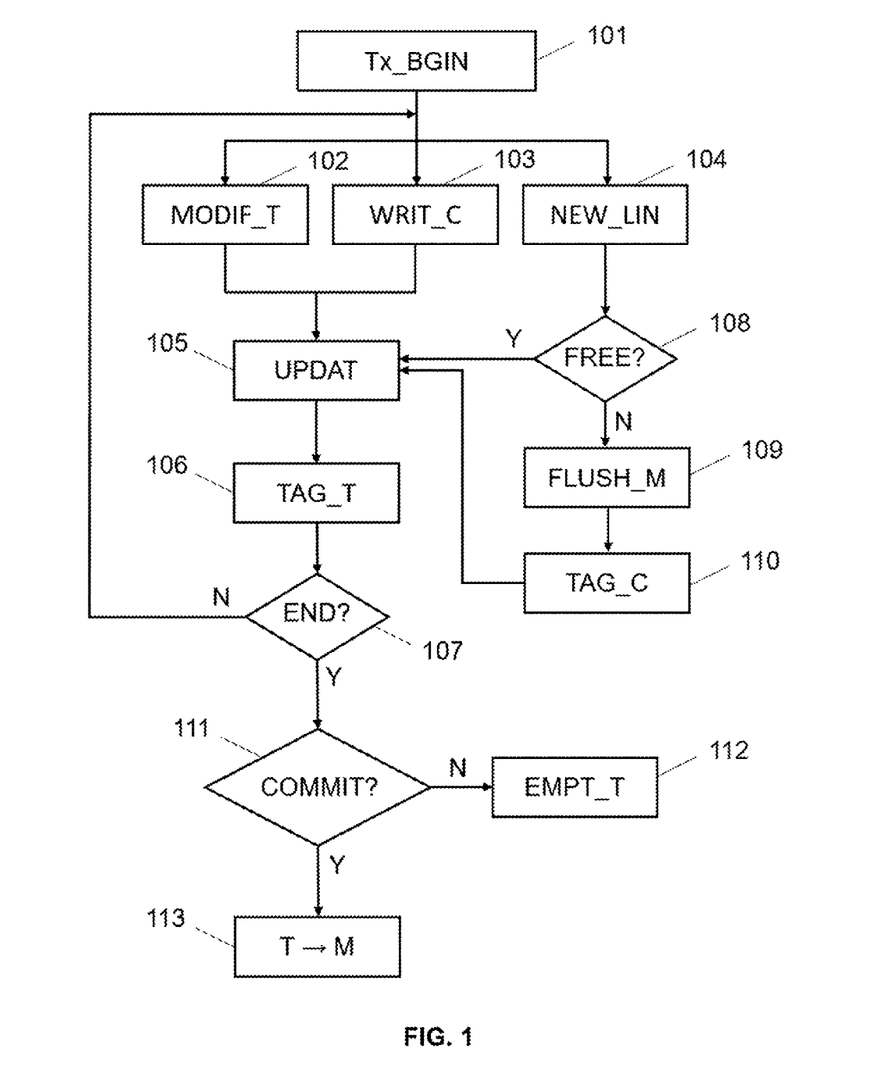
FIG. 1 is an example of a flowchart of a method for executing a transaction, according to a first embodiment of the invention.

FIG. 1 is an example of a flowchart of a method for executing a transaction, according to a first embodiment of the invention.

In step 101, an initialization command for a transaction is received. This transaction corresponds to a series of instructions (or "operations"). In the context of the present invention, only the instructions comprising writing data into one or several cache lines of the cache memory must be considered (even though the transaction may include other instructions which do not require data to be written into the cache).

In response to receiving the initialization command, a first instruction of the series of instructions is then executed. It should be noted that, upon receipt of the initialization command, the cache is not flushed, as opposed to conventional methods of the prior art.

According to the present invention, it is proposed to associate with a cache line a state belonging to a set of states, preferably predefined. According to embodiments, the set of states comprises at least three states defined in the following way:

a T state, representative of an allocation of the cache line to data of the current transaction. In other words, a cache line associated with a T state is a cache line which has been modified during the execution of the current transaction, i.e. a line into which data corresponding to the current transaction has been copied (written). The cache lines associated with a T state are locked until the end of the transaction, to the extent that their content cannot be deleted and synchronized with the persistent memory during the transaction: it is only possible to modify the content thereof during the transaction;

an M state, representative of an allocation of the cache line to data external to the transaction. In other words, a cache line associated with an M state is a cache line into which data that does not correspond to the current transaction has been copied. For example, a transaction may be suspended and external data may be written into cache lines during the suspension of the transaction. In this case, the cache lines into which the data has been written are associated with an M state. The cache lines associated with an M state may also correspond to cache lines which have been allocated to a previous transaction, as detailed below;

a C state, indicating that the content of the cache line has not been modified or already synchronized (the content may have been modified before, but may have already been synchronized with the persistent memory). For example, a cache line associated with a C state may be a cache line to which the processor has accessed in read-only mode, without modification. This state corresponds to a "clean" state as opposed to a so-called "dirty" state which typically designates a cache line, the content of which has been modified since it was read from the persistent memory, i.e. a line into which the processor has written data and the content of which was not synchronized with the persistent memory.

Other states may be created, notably an additional state corresponding to an empty line, that is to say not present in the cache (V state). In other words, a cache line associated with a V state is a line into which no data has been copied.

Cache lines of the different states can cohabit in the cache, and the states can be updated with each new operation. The association of a cache line may be performed by a cache manager, for example via a marking system: as soon as a line is copied into the cache, a marking corresponding to the state of the line (M, T, C, V) is stored in memory. Of course, the names given to the states of the cache lines (M, T, C, V) have no technical significance and the states may be called by other names.

According to still another particular embodiment and as shown in FIG. 1, three types of actions may be carried out during the execution of a cached data write instruction:
  modify (step 102) the content of a cache line associated with a T state (or more simply "T line"), that is to say a line already modified in the context of the transaction—for example a line into which data was copied during a previous instruction;
  write (step 103) data into a C line;
  write (step 104) data into a new cache line.

When modifying 102 the content of a T line or when writing 103 into a C line, the content of these lines may be updated directly (step 105) with data corresponding to the current instruction. The updated cache line is then associated (step 106), where applicable, with a T state (when modifying 102 the content of a T line, this step is of course not necessary).

When writing 104 data into a new cache line, it is first checked (step 108) whether there is at least one cache line available—in other words, if there is at least one V or C line. If there are enough cache lines available to write data (arrow "Y" of step 108), the content of this (these) empty line(s) may be directly updated 105 from the data, and the line(s) is (are) then associated with a T state (step 106) as previously.

If there are no (or insufficient) cache lines available to perform data writing ("N" arrow of step 108), a flush is performed (step 109) for all or part of the M lines. The content of these M lines is therefore copied to the persistent memory (synchronization) and the content of these lines is deleted. The lines are then associated (step 110) with a C state. The data corresponding to the current instruction can then be copied (step 105) into these newly available lines. The lines into which data has been copied are then associated with a T state (step 106).

Thus, a flush is only carried out if it is necessary to copy data into a new cache line and if there no line available. Thus, for transactions which require relatively little writing of data on new lines, a partial flush of the cache memory to the persistent memory is sufficient; and if the space available on the cache memory at the start of the transaction is sufficient, it is not even necessary to perform any flush at all.

The previous steps are repeated until the last instruction of the transaction (step 107 of FIG. 1, in which it is tested whether any instructions are still to be executed). Except in the case of a power cut (where the instruction sequence is interrupted and all the lines emptied), the last instruction executed corresponds to a commit or an abort. In step 111, it is checked which of these instructions (commit or abort) is received. If it is a commit instruction (arrow "Y" of step 111), the state of the T lines is modified and these lines are associated with an M state (step 113).

In the case of an abort instruction (arrow "N" of step 111), the T lines are not committed: their content is emptied (step 112) and the lines concerned become not present—these lines are then associated with a V state. On the other hand, the content of the M lines is preserved.

The method described above in reference to FIG. 1 is favorable as it avoids a systematic flush of the cache lines at the start of the transaction. Moreover, it is not necessary to persistently store data prior to modification, as opposed to conventional methods.

Moreover, certain transactions are committed definitively and cannot be aborted (except in the case of a power cut, in which case all the lines are flushed and become C lines). For these transactions, it is worthwhile to authorize direct transitions from the M state to the T state, in other words to make it possible to write data corresponding to the transaction directly into M lines.

Thus, according to a second embodiment implemented in the context of transactions with no abort, four types of actions can be performed in the context of an instruction:
  modifying the content of a T line;
  modifying the content of an M line;
  writing data into a C line;
  writing data into a new cache line.

When modifying the content of a T line or writing data into a C line, everything occurs as per the previous embodiment. When modifying the content of an M line, it is sufficient to update the state of that line in order to associate it with a T state once the content of the line has been modified. When writing data on a new line, it is checked, as in the previous embodiment (step 108), whether there are enough cache lines available to write the data. As previously mentioned, consideration is only given here to transactions requiring at most N cache lines, N being the maximum number of cache lines physically available in the cache. Thus, physically, the cache is sized so that the transaction can be performed. If there are not enough cache lines available, it is possible to flush the M lines not allocated to the transaction.

In this second embodiment, the M lines corresponding to data of the transaction to be modified can be directly modified and associated with a T state, without it being necessary to flush them beforehand. Thus, the number of flushes to be performed on M lines is considerably reduced. Indeed, such a flush is only performed when the cache is full, and when there are M lines which do not match data of the transaction to be modified.

The fact that a transaction may or may not be aborted can be indicated by the application programming interface or API, for example using a marking. Thus, the API indicates which type of transaction must be performed (with or without abort possible) and from this indication, the modification of the content of M lines and the direct change from an M state to a T state for a line may or may not be authorized. Thus, according to one embodiment of the invention, the cache mechanism may be executed according to either one of the two previous embodiments depending on the type of transaction to be executed, this type being indicated by the API.

In all the embodiments, it should be noted that no flushing of any of the cache lines is carried out at the end of a transaction.

The invention and its various embodiments are particularly favorable as they avoid a systematic flush of the cache at the start and/or end of the transaction. The system is thus faster, the components are less subject to wear, and power consumption is reduced. For instance, in the context of loading a profile on an eSIM card (an operation requiring a large number of transactions) according to the first embodiment, a 30% reduction in load time has been noted. According to the second embodiment, this reduction in execution time may be up to 50%.

As the number of cache lines is physically limited, it is difficult to predict beforehand whether this number is sufficient to handle the transaction and the values already updated. The invention overcomes this difficulty by modifying the model on the fly when executing the transaction. Thus, the transaction is executed without flushing the cache at the start of the transaction, and only when the cache is full, all or some of the M lines are flushed in order to recover clean and reusable inputs for the current transaction.

Figure 2:
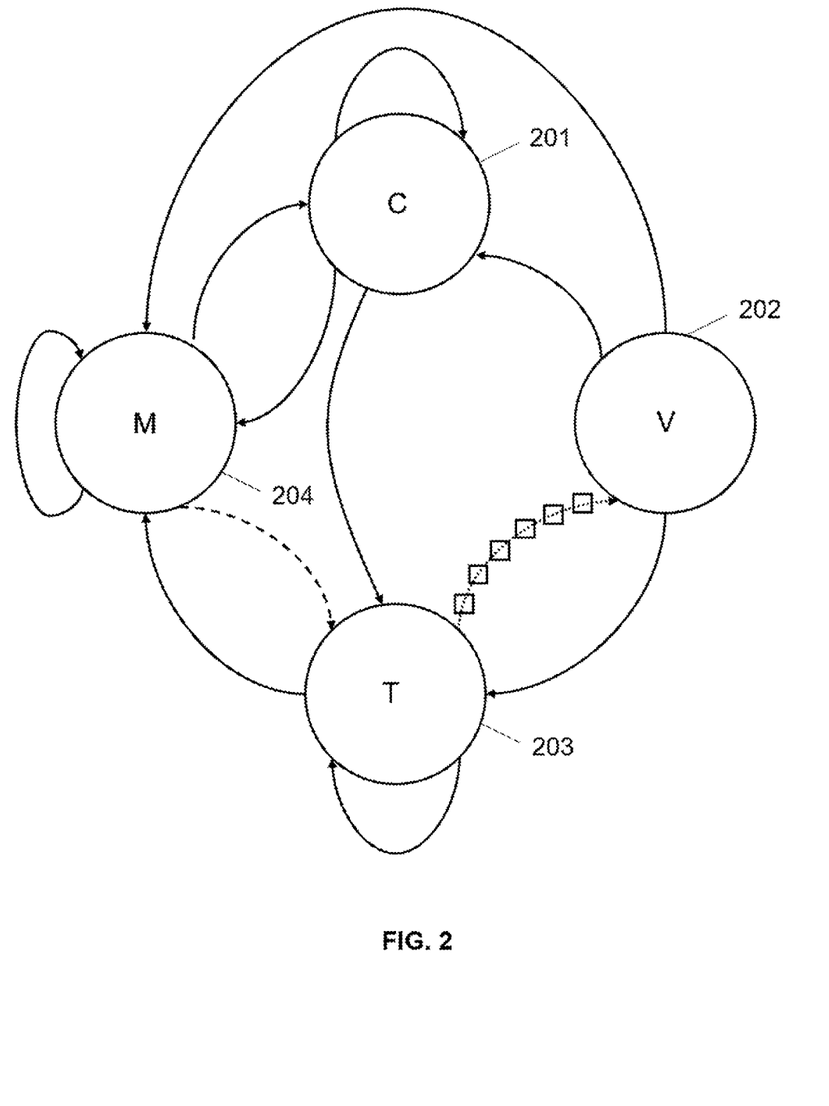
FIG. 2 represents possible transitions for the states associated with cache lines, according to several embodiments of the invention.

FIG. 2 represents possible transitions for the states associated with cache lines, according to several embodiments of the invention. In particular, FIG. 2 shows the four states previously defined: M (element 204), T (element 203), C (element 201) and V (element 202).

In FIG. 2, solid line arrows correspond to transitions common to the two embodiments, the square dotted arrow corresponds to a transition specific to the first embodiment presented above, and the dashed line arrow represents a transition specific to the second embodiment above.

As shown in FIG. 2, in all embodiments, when a line is in a V state (202), it may:
change to a C state (201), when the processor attempts to read data in the cache, but the data is not present (cache reading fault); or
change to an M state (204), when the processor attempts to read data in the cache, but the data is not present (cache write fault); or
change to a T state (203), during a cache write fault when updating the content of the line, after initialization of the transaction.

Moreover, when a line is in an M state (204), it may:
remain in the same state, when writing data external to the transaction; or
change to a C state (201) when that line is flushed to subsequently write transaction data therein (step 109 of FIG. 1).

When a line is in a C state (201), it may:
remain in the same state, if merely reading the data in that line; or
switch to a T state (203), when writing data after initializing the transaction; or
switch to an M state (204), when writing data external to the transaction.

Finally, when a line is in a T state (203), it may:
remain in the same state, when modifying or reading its content; or
change to an M state (204), when the transaction is committed; or
change to a V state (202), when the transaction is aborted.

In the first embodiment, wherein the transaction can be aborted, a line in a T state (203) can further change to a V state (202) when the transaction is aborted.

In the second embodiment, wherein the transaction cannot be aborted, a direct transition from M (204) to T (203) is allowed.

Figure 3:
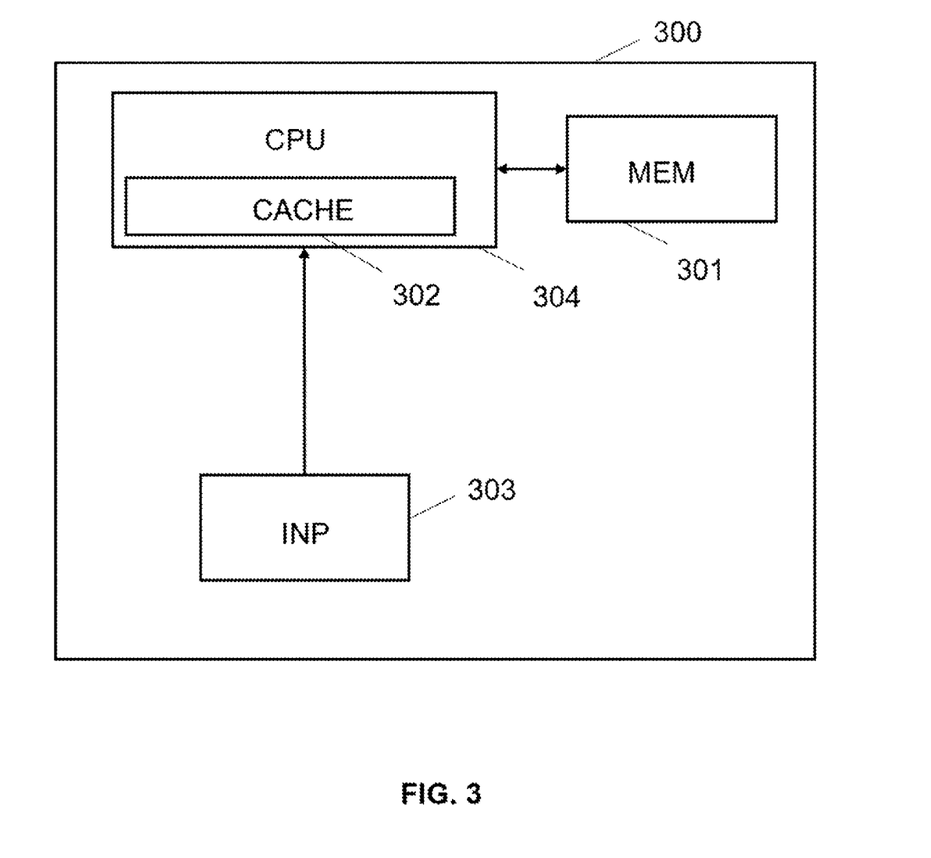
FIG. 3 represents a device for executing a transaction according to an embodiment of the invention.

FIG. 3 represents a device for executing a transaction according to an embodiment of the invention.

In this embodiment, the device 300 comprises a memory 301 to store instructions allowing the implementation of the method, and temporary data to carry out the various steps of the method as previously described.

The device further comprises a circuit 304. This circuit may be, for example:
a processor able to interpret instructions in the form of a computer program, or
an electronic board, in which the steps of the method of the invention are described in the silicon, or
a programmable electronic chip such as an FPGA chip (Field-Programmable Gate Array), such as an SOC (System On Chip) or such as an ASIC (Application Specific Integrated Circuit).

SOCs or Systems On Chip are embedded systems which integrate all the components of an electronic system in a single chip. An ASIC is a specialized electronic circuit which groups together customized functionalities for a given application. ASICs are generally configured during their manufacture and can only be simulated by the user. FPGA programmable logic circuits are electronic circuits which can be reconfigured by the user.

The circuit 304 comprises a cache memory 302. In certain embodiments, the circuit 304 may contain several caches, associated with several levels.

The device 300 may further comprise an input interface 303 to receive a command corresponding to one or several transactions (for example a profile loading command or a payment command). Finally, the device 300 may comprise, to allow easy interaction with a user, a screen and a keypad (not represented). Of course, the keypad is optional, notably in the context of a computer having the form of a touchscreen or a smartphone, for example.

Depending on the embodiment, the device 300 may be a computer, a network of computers, an electronic component, or another device comprising a processor operationally coupled to a memory, as well as, depending on the embodiment chosen, a data storage unit, and other associated hardware elements such as a network interface and a media player to read a removable storage device and write to such a device (not represented in the figure). The removable storage device may be, for example, a compact disc (CD), a digital video/polyvalent disc (DVD), a flash drive, a USB key, etc.

Depending on the embodiment, the memory, the data storage unit or the removable storage device contains instructions which, when they are executed by the control circuit 304, make this control circuit 304 perform or control the input interface parts 303, data storage in the memory 301 and/or data processing of examples of implementation of the method proposed.

The control circuit 304 may be a component implementing the control of the units 303 and 301 of the device 300.

Moreover, the functional diagram presented in FIG. 1 is a typical example of a program of which some instructions can be performed by the device 300. As such, FIG. 1 may correspond to the flowchart of the general algorithm of a computer program within the meaning of the invention.

Of course, the present invention is not limited to the embodiments described above by way of examples. It extends to other variants. In the claims, the term "comprise" does not exclude other elements or other steps. The various characteristics presented and/or claimed may be advantageously combined. Their presence in the description or in different dependent claims does not, in fact, rule out the possibility of combining them. The reference signs should not be understood as limiting the scope of the invention.

The invention claimed is:

1. A method implemented by a processor to execute a transaction with no an abort possible, said transaction including a sequence of instructions, the processor being associated with a persistent memory and a cache memory, the cache memory including a plurality of cache lines, each of the cache lines being associated with a respective state from a set of predefined states, the method comprising, for at least one instruction of the sequence of instructions requiring copying data to at least one cache line associated with a state other than a state representative of an allocation to data of said transaction:
- a. when the at least one cache line is associated with a state allowing data to be copied directly into said at least one cache line:
  - copying data corresponding to said instruction into said at least one cache line, and
  - associating said at least one cache line with the state representative of the allocation to data of said transaction; and
- b. when no cache line is associated with the state allowing data to be copied directly:
  - copying data corresponding to said instruction in at least one cache line in a set of cache lines associated with a state representative of an allocation to data external to the transaction, and
  - associating said at least one cache line with the state representative of the allocation to data of said transaction.

2. The method according to claim 1, wherein, when no cache line is associated with the state allowing data to be copied directly, said set comprises all the cache lines associated with the state representative of the allocation to data external to said transaction.

3. The method according to claim 1, wherein respective contents of cache lines associated with the state representative of the allocation to data of said transaction cannot be deleted during execution of said transaction.

4. The method according to claim 1, further comprising:
receiving an initialization command for the transaction;
in response to receipt of the initialization command, preserving a current content of the cache memory; and
executing a first instruction of the sequence of instructions according to operation a or b, the execution of the first instruction comprising a modification of the current content of the cache memory from data corresponding to the first instruction.

5. The method according to claim 4, further comprising:
receiving a piece of information indicating that the initialization command received corresponds to the transaction with no abort possible.

6. The method according to claim 1, further comprising:
receiving a validation instruction for said transaction; and
in response to receiving the validation instruction of said transaction, modifying the states of the cache lines associated with the state representative of the allocation to data of said transaction, and associating the states with the state representative of the allocation to data external to said transaction.

7. A computer program product comprising instructions for carrying out the method according to claim 1 when said program is run by a processor.

8. A device for executing a transaction with no abort possible, said transaction including a sequence of instructions, the device being associated with a persistent memory and a cache memory, the cache memory including a plurality of cache lines, each of the cache lines being associated with a respective state from a set of predefined states, the device comprising:
a circuit configured to, for at least one instruction of the sequence of instructions requiring data to be copied to at least one cache line associated with a state other than a state representative of an allocation to data of said transaction:
- a. when the at least one cache line is associated with a state allowing data to be copied directly into said at least one cache line:
  - copying data corresponding to said instruction into said at least one cache line, and
  - associating said at least one cache line with the state representative of the allocation to data of said transaction, and
- b. when no cache line is associated with the state allowing data to be copied directly:
  - copying data corresponding to said instruction in at least one cache line in a set of cache lines associated with a state representative of an allocation to data external to the transaction, and
  - associating said at least one cache line with the state representative of the allocation to data of said transaction.

* * * * *